United States Patent
Kitagawa et al.

(10) Patent No.: US 9,512,284 B2
(45) Date of Patent: Dec. 6, 2016

(54) FUMARIC ACID DIESTER-CINNAMIC ACID ESTER-BASED COPOLYMER, PRODUCTION METHOD THEREOF AND FILM USING THE SAME

(71) Applicant: TOSOH CORPORATION, Shunan-shi (JP)

(72) Inventors: Takahiro Kitagawa, Mie (JP); Tohru Doi, Mie (JP); Yasuyoshi Fujii, Mie (JP); Kota Sakaguchi, Mie (JP); Akira Inui, Mie (JP); Masayasu Ito, Mie (JP)

(73) Assignee: TOSOH CORPORATION, Shunan-shi (JP)

( * ) Notice: Subject to any disclaimer, the term of this patent is extended or adjusted under 35 U.S.C. 154(b) by 0 days.

(21) Appl. No.: 14/647,715

(22) PCT Filed: Nov. 25, 2013

(86) PCT No.: PCT/JP2013/081678
§ 371 (c)(1),
(2) Date: May 27, 2015

(87) PCT Pub. No.: WO2014/084178
PCT Pub. Date: Jun. 5, 2014

(65) Prior Publication Data
US 2015/0291751 A1 Oct. 15, 2015

(30) Foreign Application Priority Data

Nov. 28, 2012 (JP) .................................. 2012-259771
Nov. 28, 2012 (JP) .................................. 2012-259772
Dec. 14, 2012 (JP) .................................. 2012-273982
Apr. 16, 2013 (JP) .................................. 2013-085661

(51) Int. Cl.
*C08J 5/18* (2006.01)
*C08F 222/14* (2006.01)
*C09D 133/14* (2006.01)
*C08F 265/04* (2006.01)

(52) U.S. Cl.
CPC ............... *C08J 5/18* (2013.01); *C08F 222/14* (2013.01); *C08F 265/04* (2013.01); *C09D 133/14* (2013.01); *C08J 2333/04* (2013.01); *C08J 2333/06* (2013.01); *C08J 2333/08* (2013.01)

(58) Field of Classification Search
CPC ....... C08J 5/18; C08J 2333/06; C08J 2333/08; C08J 2333/04; C08F 2224/14; C08F 265/04; C09D 133/14
USPC ....................................................... 526/326
See application file for complete search history.

(56) References Cited

U.S. PATENT DOCUMENTS

| | | | |
|---|---|---|---|
| 4,355,136 A | 10/1982 | Dombroski et al. | |
| 2007/0298247 A1 | 12/2007 | Makita et al. | |
| 2008/0068545 A1 | 3/2008 | Doi et al. | |
| 2009/0176944 A1* | 7/2009 | Burckhardt | ........... C07C 251/08 525/452 |
| 2011/0060157 A1 | 3/2011 | Glaser et al. | |
| 2012/0269050 A1 | 10/2012 | Okada et al. | |
| 2013/0102751 A1 | 4/2013 | Makita et al. | |

FOREIGN PATENT DOCUMENTS

| | | | | |
|---|---|---|---|---|
| EP | 1 898 252 A1 | 3/2008 | | |
| GB | 905680 A | * | 9/1962 | ............ C08F 220/06 |
| JP | 2002 332311 | 11/2002 | | |
| JP | 2004 168915 | 6/2004 | | |
| JP | 2006 193616 | 7/2006 | | |
| WO | 2012 005120 | 1/2012 | | |
| WO | WO 2012/053290 A1 | 4/2012 | | |

OTHER PUBLICATIONS

Combined Office Action and Search Report issued Dec. 22, 2015 in Chinese Patent Application No. 201380062188.6 (with English language translation and English Translation of Category of Cited Documents).
International Search Report Issued Feb. 10, 2014 in PCT/JP13/081678 Filed Nov. 25, 2013.
Office Action issued May 24, 2016, in Japanese Patent Application No. 2012-259772, filed Nov. 28, 2012 w/Machine English translation.
Extended European Search Repot issued Jun. 3, 2016 in Patent Application No. 13859393.4.
Notification of Reasons for Refusal issued Jun. 13, 2016, in Japanese Patent Application No. 2012-273982, filed Dec. 14, 2012.
Notification of Reasons for Refusal issued Aug. 9, 2016, in Japanese Patent Application No. 2013-085661, filed Apr. 16, 2013 w/Machine translation.

* cited by examiner

*Primary Examiner* — Michael M Bernshteyn
(74) *Attorney, Agent, or Firm* — Oblon, McClelland, Maier & Neustadt, L.L.P.

(57) ABSTRACT

To provide a novel fumaric acid diester-cinnamic acid ester-based copolymer having a high molecular weight, which is expected to maintain excellent strength or ensures excellent toughness even when formed into a film, a method for efficiently producing the copolymer, and a film using the same. The fumaric acid diester-cinnamic acid ester-based copolymer contains a fumaric acid diester residue unit, a cinnamic acid ester residue unit having an alkyl group with a carbon number of 1 to 6, and a residue unit of a polyfunctional monomer having two or more radical polymerizable functional groups.

13 Claims, No Drawings of the present invention is to provide a novel
FUMARIC ACID DIESTER-CINNAMIC ACID ESTER-BASED COPOLYMER, PRODUCTION METHOD THEREOF AND FILM USING THE SAME

TECHNICAL FIELD

The present invention relates to a novel fumaric acid diester-cinnamic acid ester-based copolymer, a production method thereof, and a film using the same. More specifically, the present invention relates to a novel fumaric acid diester-cinnamic acid ester-based copolymer having a high molecular weight, which is expected to find its application also to a film, etc., a method for efficiently producing the copolymer, and a film using the same.

BACKGROUND ART

A liquid crystal display is being used as the most important display device in the multimedia society over a wide range, including a cellular phone, a computer monitor, a laptop computer and a television set. In a liquid crystal display, many optical films are used so as to enhance the display characteristics, and among others, a retardation film fulfills a great role in, for example, improving the contrast or compensating the color tone when the display is viewed from the front or oblique direction. As the conventional retardation film, a polycarbonate or a cyclic polyolefin is used, and all of these polymers are a polymer having positive birefringence.

The polymer having negative birefringence includes an acrylic resin and a polystyrene, but the acrylic resin is a small retardation and is insufficient in the characteristics as a retardation film. The polystyrene is not used at present, because this polymer has a problem with retardation stability, such as occurrence of a change in the retardation with a slight stress due to its large photoelastic coefficient in a low temperature region; a problem in view of optical characteristics, such as large wavelength dependency of the retardation; and a problem in practical use, such as low heat resistance.

To meet the market requirement for a retardation film having negative birefringence, a fumaric acid diester-based resin and a film composed of the resin have been proposed (see, for example, Patent Documents 1 to 5).

BACKGROUND ART DOCUMENT

Patent Document

Patent Document 1: JP-A-2008-112141
Patent Document 2: JP-A-2012-032784
Patent Document 3: International Publication No. 2012/005120, pamphlet
Patent Document 4: JP-A-2008-129465
Patent Document 5: JP-A-2006-193616

SUMMARY OF INVENTION

Problem that Invention is to Solve

The fumaric acid diester-based resin and the film composed of the resin, proposed in Patent Documents 1 to 5, develop a high out-of-plane retardation, but there is a demand at present for the advent of a resin capable of developing a higher out-of-plane retardation while maintaining the characteristics as a film even in the case of a thin film.

An object of the present invention is to provide a novel fumaric acid diester-cinnamic acid ester-based copolymer having a high molecular weight, which is expected to maintain excellent strength even when formed into a film, a method for efficiently producing the same, and a film using the same.

Another object of the present invention is to provide a novel fumaric acid diester-cinnamic acid ester-based copolymer having a high molecular weight, which ensures excellent toughness even when formed into a film, a method for efficiently producing the same, and a film using the same.

Means for Solving Problem

As a result of intensive studies to attain these objects, the present inventors have found that the above-described problems can be solved by a specific fumaric acid diester-cinnamic acid ester-based copolymer. The present invention has been accomplished based on this finding.

That is, the present invention relates to a fumaric acid diester-cinnamic acid ester-based copolymer containing a fumaric acid diester residue unit, a cinnamic acid ester residue unit having an alkyl group with a carbon number of 1 to 6, and a residue unit of a polyfunctional monomer having two or more radical polymerizable functional groups, a production method thereof, and a film using the same.

Effects of Invention

The fumaric acid diester-cinnamic acid ester-based copolymer of the present invention has a high molecular weight and therefore, is excellent in the characteristics when formed into a film, etc. In addition, the production method of a fumaric acid diester-cinnamic acid ester-based copolymer of the present invention can efficiently produce a novel fumaric acid diester-cinnamic acid ester-based copolymer.

Mode for Carrying Out Invention

The fumaric acid diester-cinnamic acid ester-based copolymer of the present invention is described in detail below.

The fumaric acid diester-cinnamic acid ester-based copolymer of the present invention is a fumaric acid diester-cinnamic acid ester-based copolymer containing a fumaric acid diester residue unit, a cinnamic acid ester residue unit having an alkyl group with a carbon number of 1 to 6, and a residue unit of a polyfunctional monomer having two or more radical polymerizable functional groups.

The fumaric acid diester residue unit includes, for example, a dimethyl fumarate residue unit, a diethyl fumarate residue unit, a diisopropyl fumarate residue unit, a di-n-butyl fumarate residue unit, a di-s-butyl fumarate residue unit, a di-tert-butyl fumarate residue unit, a di-n-pentyl fumarate residue unit, a di-s-pentyl fumarate residue unit, a di-tert-pentyl fumarate residue unit, a di-n-hexyl fumarate residue unit, a di-s-hexyl fumarate residue unit, a di-tert-hexyl fumarate residue unit, a dicyclopropyl fumarate residue unit, a dicyclopentyl fumarate residue unit, a dicyclohexyl fumarate residue unit, and a bis(2-ethylhexyl) fumarate residue unit. One of these fumaric acid diester residue units may be contained, or two or more thereof may be contained. Among others, a diethyl fumarate residue unit and a diisopropyl fumarate residue are preferred, because a fumaric acid diester-cinnamic acid ester-based copolymer having a high molecular weight can be efficiently obtained.

In the cinnamic acid ester residue unit having an alkyl group with a carbon number of 1 to 6, the alkyl group with a carbon number of 1 to 6 is independent of each other and includes, for example, a methyl group, an ethyl group, an n-propyl group, an isopropyl group, an n-butyl group, an isobutyl group, a tert-butyl group, an n-pentyl group, and an n-hexyl group. Such an alkyl group may be substituted with a halogen group such as fluorine and chlorine, an ether group, an ester group or an amino group, etc. The cinnamic acid ester residue unit having an alkyl group with a carbon number of 1 to 6 includes those deriving from a cinnamic acid ester having an alkyl group with a carbon number of 1 to 6. The cinnamic acid ester having an alkyl group with a carbon number of 1 to 6 includes, for example, methyl cinnamate, ethyl cinnamate, n-propyl cinnamate, isopropyl cinnamate, n-butyl cinnamate, isobutyl cinnamate, tert-butyl cinnamate, n-pentyl cinnamate, and n-hexyl cinnamate. One of these cinnamic acid ester residue units may be contained, or two or more thereof may be contained. Among others, a methyl cinnamate residue unit, an ethyl cinnamate residue unit and an isopropyl cinnamate residue unit are preferred, because a fumaric acid diester-cinnamic acid ester-based copolymer having a high molecular weight can be efficiently obtained.

The radical polymerizable functional group in the residue unit of a polyfunctional monomer having two or more radical polymerizable functional groups includes, for example, a vinyl group and a methacryl group, and any residue unit may be used as long as it is a residue unit of a polyfunctional monomer having two or more radical polymerizable functional groups described above. The polyfunctional monomer having two or more radical polymerizable functional groups, from which the residue unit is derived, include those deriving from a polyfunctional vinyl-based compound, a polyfunctional methacrylic-based compound, etc., and one of these monomers may be contained, or two or more thereof may be contained. The polyfunctional vinyl-based compound includes, for example, an aromatic polyvinyl compound such as divinylbenzene, divinyltoluene, divinylxylene, trivinylbenzene, divinylbiphenyl, divinylnaphthalene, divinylfluorene, divinylcarbazole and divinylpyridine; a polyvinyl ester compound such as divinyl adipate, divinyl maleate, divinyl phthalate, divinyl isophthalate and divinyl itaconate; a polyallyl ester compound such as diallyl maleate, diallyl phthalate, diallyl isophthalate and diallyl adipate; a polyfunctional vinyl ether having two or more radical polymerizable functional groups, such as divinyl ether, ethylene glycol divinyl ether, propanediol divinyl ether, propylene glycol divinyl ether, butanediol divinyl ether, 1-methylpropanediol divinyl ether, hexanediol divinyl ether, 1-ethylethylene glycol divinyl ether, 1-methylpropanediol divinyl ether, 2-methylpropanediol divinyl ether, 1,1-dimethylethylene glycol divinyl ether, 1,2-dimethylethylene glycol divinyl ether, 1-ethylethylene glycol divinyl ether, cyclohexane-1,4-divinyl ether, 1,6-hexanediol divinyl ether, 1,4-cyclohexanedimethanol divinyl ether, 1,3-cyclohexanedimethanol divinyl ether, 1,2-cyclohexanedimethanol divinyl ether, p-xylylene glycol divinyl ether, m-xylylene glycol divinyl ether, o-xylylene glycol divinyl ether, diethylene glycol divinyl ether, triethylene glycol divinyl ether, tetraethylene glycol divinyl ether, pentaethylene glycol divinyl ether, oligoethylene glycol divinyl ether, polyethylene glycol divinyl ether, dipropylene glycol divinyl ether, tripropylene glycol divinyl ether, tetrapropylene glycol divinyl ether, pentapropylene glycol divinyl ether, oligopropylene glycol divinyl ether, polypropylene glycol divinyl ether, ethylene glycol-propylene glycol copolymer divinyl ether, trimethylolpropane trivinyl ether, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxypropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropoxyethoxy)ethyl (meth)acrylate, 2-(isopropoxyethoxyethoxy)ethyl (meth)acrylate, 2-(isopropoxyethoxyethoxy)ethyl (meth)acrylate, 2-(isopropoxyethoxyethoxyethoxy)ethyl (meth)acrylate, polyethylene glycol monovinyl ether (meth)acrylate and polypropylene glycol monovinyl ether (meth)acrylate; a polyallyl ether compound such as diallyl ether, diallyloxyethane, diallyloxyethane, tetraallyloxyethane, tetraallyloxypropane, tetraallyloxybutane and tetramethallyloxyethane; a polyvinyl fluorine compound such as 1,4-divinylperfluorobutane, 1,6-divinylperfluorohexane and 1,8-divinylperfluorooctane; and bismaleimides such as 1,4-phenylenebismaleimide and 1,1'-(methylenedi-4,1-phenylene)bismaleimide. The polyfunctional methacrylic-based compound includes, for example, benzene trimethacrylate, 1,4-butanediol dimethacrylate, 1,6-hexanediol dimethacrylate, 1,9-nonanediol dimethacrylate, ethylene glycol dimethacrylate, polyethylene glycol dimethacrylate, polypropylene glycol dimethacrylate, neopentyl glycol dimethacrylate, hydroxypivalic acid ester neopentyl glycol dimethacrylate, caprolactone-modified hydroxypivalic acid ester neopentyl glycol dimethacrylate, glycerin trimethacrylate, trimethylolpropane trimethacrylate, ditrimethylolpropane tetramethacrylate, pentaerythritol trimethacrylate, and pentaerythritol tetramethacrylate. The fumaric acid diester-cinnamic acid ester-based copolymer of the present invention contains a residual unit of a polyfunctional monomer having two or more radical polymerizable functional groups, whereby not only a higher molecular weight can be achieved but also a high polymerization conversion ratio of a monomer at the time of formation of a polymer and an excellent production efficiency are obtained. The residue unit of a polyfunctional monomer having two or more radical polymerizable functional groups is preferably an aromatic polyvinyl compound or a polyfunctional vinyl ether having two or more radical polymerizable functional groups, because when the copolymer of the present invention is used as a film, the film obtained is more excellent in the toughness and maintains higher strength. The polyfunctional vinyl ether is not particularly limited as long as it is a polyfunctional vinyl ether containing a moiety having one or more vinyl ether units.

The fumaric acid diester-cinnamic acid ester-based copolymer may contain other monomer residue units within the scope of the present invention, and other monomer residue units include, for example, one member or two or more members selected from a residue unit of styrenes, such as styrene residue unit and α-methylstyrene residue unit; a (meth)acrylic acid residue unit; a (meth)acrylic acid ester residue unit such as methyl (meth)acrylate residue unit, ethyl (meth)acrylate residue unit and butyl (meth)acrylate residue unit; a residue unit of vinyl esters, such as vinyl acetate residue unit and vinyl propionate residue unit; an acrylonitrile residue unit; a methacrylonitrile residue unit; a residue unit of vinyl ethers, such as methyl vinyl ether residue unit, ethyl vinyl ether residue unit and butyl vinyl ether residue unit; a residue unit of N-substituted maleimides, such as N-methylmaleimide residue unit, N-cyclohexylmaleimide residue unit and N-phenylmaleimide residue unit; and a residue unit of olefins, such as ethylene residue unit and propylene residue unit.

For the reason that a fumaric acid diester-cinnamic acid ester-based copolymer having a high molecular weight and being excellent in the solubility for a solvent, etc. as well as in the strength, etc. when formed into a film is obtained, the composition of the fumaric acid diester-cinnamic acid ester-based copolymer of the present invention preferably consists of from 50 to 98 mol % of a fumaric acid diester residue unit, from 1 to 49 mol % of a cinnamic acid ester residue unit having an alkyl group with a carbon number of 1 to 6, and from 0.01 to 1 mol % of a residue unit of a polyfunctional monomer having two or more radical polymerizable functional groups; more preferably from 50 to 98.5 mol % of a diisopropyl fumarate residue unit, from 1 to 49.5 mol % of a cinnamic acid ester residue unit having an alkyl group with a carbon number of 1 to 6, and from 0.01 to 0.5 mol % of a residue unit of a polyfunctional monomer having two or more radical polymerizable functional groups; still more preferably from 69.7 to 96.7 mol % of a fumaric acid diester residue unit, from 3 to 30 mol % of a cinnamic acid ester residue unit having an alkyl group with a carbon number of 1 to 6, and from 0.01 to 0.3 mol % of a residue unit of a polyfunctional monomer having two or more radical polymerizable functional groups.

For the reason that the fumaric acid diester-cinnamic acid ester-based copolymer of the present invention becomes excellent in the mechanical properties and the strength when formed into a film, the number average molecular weight in terms of standard polystyrene as determined from an elution curve obtained by gel permeation chromatography (GPC) measurement is preferably from 70,000 to 500,000, more preferably from 80,000 to 500,000, still more preferably from 80,000 to 300,000, and most preferably from 90,000 to 300,000.

As for the production method of the fumaric acid diester-cinnamic acid ester-based copolymer of the present invention, the copolymer may be produced by any method as long as a fumaric acid diester-cinnamic acid ester-based copolymer is obtained, and, for example, the copolymer can be produced by performing radial polymerization, etc. of a fumaric acid diester, a cinnamic acid ester having an alkyl group with a carbon number of 1 to 6 and a polyfunctional monomer having two or more radical polymerizable functional groups. At this time, the cinnamic acid ester having an alkyl group with a carbon number of 1 to 6 includes, for example, a compound from which the above-described cinnamic acid ester residue unit having an alkyl group with a carbon number of 1 to 6 is derived. The polyfunctional monomer having two or more radical polymerizable functional groups includes, for example, a compound from which a residue unit of a polyfunctional monomer having two or more radical polymerizable functional groups described above is derived.

In the radical polymerization, a known polymerization method, for example, any of a bulk polymerization method, a solution polymerization method, a suspension polymerization method, a precipitation polymerization method and an emulsion polymerization method, may be employed.

The radical polymerization initiator when performing radical polymerization includes, for example, an organic peroxide such as benzoyl peroxide, lauryl peroxide, octanoyl peroxide, acetyl peroxide, di-tert-butyl peroxide, tert-butylcumyl peroxide, dicumyl peroxide, tert-butylperoxy acetate and tert-butylperoxy benzoate; and an azo-based initiator such as 2,2'-azobis(2,4-dimethylvaleronitrile), 2,2'-azobis (2-butyronitrile), 2,2'-azobisisobutyronitrile, dimethyl 2,2'-azobisisobutyrate and 1,1'-azobis(cyclohexane-1-carbonitrile).

The solvent usable in the solution polymerization method, suspension polymerization method, precipitation polymerization method or emulsion polymerization method is not particularly limited and includes, for example, an aromatic solvent such as benzene, toluene and xylene; an alcohol-based solvent such as methanol, ethanol, propanol and butanol; cyclohexane; dioxane; tetrahydrofuran; acetone; methyl ethyl ketone; dimethyl formamide; isopropyl acetate; and a mixed solvent thereof.

The polymerization temperature when performing radical polymerization may be appropriately set according to the decomposition temperature of the radical polymerization initiator, and it is generally preferable to perform the polymerization at 30 to 150° C., because the control of reaction is easy.

Furthermore, at the time of production of the fumaric acid diester-cinnamic acid ester-based copolymer of the present invention, for the reason that a fumaric acid diester-cinnamic acid ester-based copolymer having a higher molecular weight can be efficiently produced, the radical polymerization reaction is preferably performed using a total of 100 mol % of monomers containing from 50 to 98 mol % of a fumaric acid diester, from 1 to 49 mol % of a cinnamic acid ester having an alkyl group with a carbon number of 1 to 6, and from 0.01 to 1 mol % of a polyfunctional monomer having two or more radical polymerizable functional groups, in the presence of from 0.001 to 2 mol % of a radical polymerization initiator.

The fumaric acid diester-cinnamic acid ester-based copolymer of the present invention has excellent solubility in a solvent and can be formed into a film by a method such as solution casting, and the film is excellent in the film strength, etc.

In the present invention, a preferred embodiment of the fumaric acid diester-cinnamic acid ester-based copolymer is a fumaric acid diester-cinnamic acid ester-based copolymer in which the fumaric acid diester residue unit is a diisopropyl fumarate residue unit and the residue unit of a polyfunctional monomer having two or more radical polymerizable functional groups is a residue unit of a polyfunctional acrylate having a urethane bond or an ester bond.

The fumaric acid diester-cinnamic acid ester-based copolymer in which the fumaric acid diester residue unit is a diisopropyl fumarate residue unit and the residue unit of a polyfunctional monomer having two or more radical polymerizable functional groups is a residue unit of a polyfunctional acrylate having a urethane bond or an ester bond, is described below.

The residue unit of a polyfunctional acrylate having a urethane bond may be any as long as it is a residue unit of a polyfunctional acrylate containing a moiety having a urethane bond and a moiety having two or more acrylate units. The residue unit of a polyfunctional acrylate having an ester bond may be any as long as it is a residue unit of a polyfunctional acrylate containing a moiety having an ester bond and a moiety having two or more acrylate units.

The fumaric acid diester-cinnamic acid ester-based copolymer in a preferred embodiment of the present invention contains a residue unit of a polyfunctional acrylate having a urethane bond or an ester bond, whereby not only a higher molecular weight can be achieved but also a high polymerization conversion ratio of a monomer at the time of formation of a polymer and an excellent production efficiency are obtained. In addition, when the obtained fumaric acid diester-cinnamic acid ester-based copolymer is formed into a film, the film is excellent in the toughness. Here, in the case of a residue unit of a polyfunctional acrylate having no urethane bond and no ester bond, there may arise a problem, for example, that the polymer obtained can hardly have a high molecular weight or the film formed suffers from poor toughness. In the case of a residue unit of a monomer other than a polyfunctional acrylate, the effect of increasing the polymerization conversion ratio can be hardly exerted, which may give rise to a problem such as failure in bringing out the effect of improving the production efficiency.

The polyfunctional acrylate having a urethane bond, from which the residue unit of a polyfunctional acrylate having a urethane bond is derived, can be obtained, for example, by a method where the monomer is produced by a urethanation reaction of isocyanate group-containing acrylates with polyalcohols, or a method where the monomer is produced by a urethanation reaction of hydroxyl group-containing acrylates with polyisocyanates. The isocyanate group-containing acrylates include, for example, 2-acryloyloxyethyl isocyanate, 3-acryloyloxypropyl isocyanate, 4-acryloyloxybutyl isocyanate, 5-acryloyloxypentyl isocyanate, 6-acryloyloxyhexyl isocyanate, 3-acryloyloxyphenyl isocyanate, and 4-acryloyloxyphenyl isocyanate, and the polyalcohols include ethylene glycol, propylene glycol, 1,4-butanediol, glycerin, polyethylene glycol, polypropylene glycol, polytetramethylene glycol, etc. The hydroxyl group-containing acrylates include hydroxyethyl acrylate, polyethylene glycol acrylate, 2-hydroxypropyl acrylate, pentaerythritol triacrylate, dipentaerythritol pentaacrylate, etc., and the polyisocyanates include hexamethylene diisocyanato, bis(4-isocyanatocyclohexyl)methane, isophorone diisocyanato, bis(isocyanatomethyl)norbornane, hexamethylene diisocyanato trimer, etc. The polyfunctional acrylate having a urethane bond may be, for example, a reaction product of hydroxyethyl acrylate with hexamethylene diisocyanato, a reaction product of hydroxyethyl acrylate with bis(4-isocyanatocyclohexyl)methane, a reaction product of hydroxyethyl acrylate with isophorone diisocyanato, a reaction product of 2-hydroxypropyl acrylate with bis(isocyanatomethyl)norbornane, a reaction product of polyethylene glycol acrylate with hexamethylene diisocyanato, a reaction product of polyethylene glycol acrylate with bis(4-isocyanatocyclohexyl)methane, a reaction product of polyethylene glycol acrylate with isophorone diisocyanato, a reaction product of pentaerythritol triacrylate with hexamethylene diisocyanato, a reaction product of pentaerythritol triacrylate with isophorone diisocyanato, or a reaction product of dipentaerythritol pentaacrylate with hexamethylene diisocyanato trimer, and one of these reaction products may be contained, or two or more thereof may be contained.

As the polyfunctional acrylate having a urethane bond, there are available as a commercial product, for example, (trade name) U-2PPA (produced by Shin-Nakamura Chemical Co., Ltd.), (trade name) U-6HA (produced by Shin-Nakamura Chemical Co., Ltd.), (trade name) UA-32P (produced by Shin-Nakamura Chemical Co., Ltd.), (trade name) UA-NDP (produced by Shin-Nakamura Chemical Co., Ltd.), (trade name) U-108A (produced by Shin-Nakamura Chemical Co., Ltd.), (trade name) UA-511 (produced by Shin-Nakamura Chemical Co., Ltd.), (trade name) UA-4200 (produced by Shin-Nakamura Chemical Co., Ltd.), (trade name) UA-340P (produced by Shin-Nakamura Chemical Co., Ltd.), (trade name) UA-6200 (produced by Shin-Nakamura Chemical Co., Ltd.), (trade name) U-108 (produced by Shin-Nakamura Chemical Co., Ltd.), (trade name) UA-512 (produced by Shin-Nakamura Chemical Co., Ltd.), (trade name) UA-7000 (produced by Shin-Nakamura Chemical Co., Ltd.), (trade name) UA-7200 (produced by Shin-Nakamura Chemical Co., Ltd.), (trade name) M-1200 (produced by Toagosei Co., Ltd.), (trade name) M-1600 (produced by Toagosei Co., Ltd.), and (trade name) M-1960 (produced by Toagosei Co., Ltd.).

The polyfunctional acrylate having an ester bond, from which the residue unit of a polyfunctional acrylate having an ester bond is derived, can be obtained, for example, by a method where the monomer is produced by an esterification reaction of acrylates having a carboxylic acid group, a carboxylic acid ester group or an acid halide group with polyalcohols, or a method where the monomer is produced by an esterification reaction of hydroxyl group-containing acrylates with a polycarboxylic acid compound, a polycarboxylic acid ester compound or a polyacid halide compound. The acrylates having a carboxylic acid group, a carboxylic acid ester group or an acid halide group include, for example, acrylic acid, methyl acrylate, ethyl acrylate, butyl acrylate, acrylic acid chloride, and acrylic acid bromide, and the polyalcohols include ethylene glycol, propylene glycol, 1,4-butanediol, 1,5-pentanediol, 1,6-hexanediol, 1,9-nonanediol, glycerin, polyethylene glycol, polypropylene glycol, polytetramethylene glycol, pentaerythritol, etc. The hydroxyl group-containing acrylates include hydroxyethyl acrylate, polyethylene glycol acrylate, 2-hydroxypropyl acrylate, pentaerythritol triacrylate, dipentaerythritol pentaacrylate, etc., and the polycarboxylic acid compound, polycarboxylic acid ester compound or polyacid halide compound includes oxalic acid, dimethyl oxalate, diethyl oxalate, oxalic acid dichloride, oxalic acid dibromide, malonic acid, dimethyl malonate, diethyl malonate, malonic acid dichloride, malonic acid dibromide, glutaric acid, dimethyl glutarate, diethyl glutarate, glutaric acid dichloride, glutaric acid dibromide, adipic acid, dimethyl adipate, diethyl adipate, adipic acid dichloride, adipic acid dibromide, etc. The polyfunctional acrylate having an ester bond may be, for example, ethylene glycol diacrylate, polyethylene glycol diacrylate, polypropylene glycol diacrylate, polybutylene glycol diacrylate, 1,4-butanediol diacrylate, 1,6-hexanediol diacrylate, 1,9-nonanediol diacrylate, neopentyl glycol diacrylate, polyester diacrylate, triglycerol diacrylate, ethylene oxide-modified glycerin triacrylate, propylene oxide-modified glycerin triacrylate, epichlorohydrin-modified glycerin triacrylate, trimethylolpropane triacrylate, ditrimethylolpropane tetraacrylate, pentaerythritol triacrylate, pentaerythritol tetraacrylate, ethylene oxide-modified pentaerythritol tetraacrylate, dipentaerythritol pentaacrylate, or dipentaerythritol hexaacrylate, and one of these monomers may be contained, or two or more thereof may be contained.

In the present invention, in the case where the fumaric acid diester residue unit is a diisopropyl fumarate residue unit and the residue unit of a polyfunctional monomer having two or more radical polymerizable functional groups is a residue unit of a polyfunctional acrylate having a urethane bond or an ester bond, for the reason why the fumaric acid diester-cinnamic acid ester-based copolymer having a high molecular weight that the solubility in a solvent, etc. as well as the strength, toughness, etc. when formed into a film are excellent is obtained, the composition of the fumaric acid diester-cinnamic acid ester-based copolymer preferably consists of from 50 to 98.5 mol % of a diisopropyl fumarate residue unit, from 1 to 49.5 mol % of a cinnamic acid ester residue unit having an alkyl group with a carbon number of 1 to 6, and from 0.01 to 0.5 mol % of a residue unit of a polyfunctional acrylate having a urethane bond or an ester bond; more preferably from 69.7 to 96.7 mol % of a diisopropyl fumarate residue unit, from 3 to 30 mol % of a cinnamic acid ester residue unit having an alkyl group with a carbon number of 1 to 6, and from 0.01 to 0.3 mol % of a residue unit of a polyfunctional acrylate having a urethane bond or an ester bond.

In the present invention, in the case where the residue unit of a polyfunctional monomer having two or more radical polymerizable functional groups is a residue unit of a polyfunctional acrylate having a urethane bond, for the reason that the mechanical properties as well as the strength and toughness when formed into a film are excellent, the number average molecular weight in terms of standard polystyrene as determined from an elution curve obtained by gel permeation chromatography (GPC) measurement is preferably from 70,000 to 500,000, more preferably from 80,000 to 300,000.

In the present invention, in the case where the residue unit of a polyfunctional monomer having two or more radical polymerizable functional groups is a residue unit of a polyfunctional acrylate having an ester bond, the number average molecular weight in terms of standard polystyrene as determined from an elution curve obtained by gel permeation chromatography (GPC) measurement is preferably from 60,000 to 500,000, more preferably from 80,000 to 300,000.

In the present invention, when producing a fumaric acid diester-cinnamic acid ester-based copolymer in which the fumaric acid diester residue unit is a diisopropyl fumarate residue unit and the residue unit of a polyfunctional monomer having two or more radical polymerizable functional groups is a residue unit of a polyfunctional acrylate having a urethane bond or an ester bond, for the reason that a fumaric acid diester-cinnamic acid ester-based copolymer having a higher molecular weight can be more efficiently produced, the radical polymerization reaction is preferably performed using a total of 100 mol % of monomers containing from 50 to 98.5 mol % of diisopropyl fumarate, from 1 to 49.5 mol % of a cinnamic acid ester having an alkyl group with a carbon number of 1 to 6, and from 0.01 to 0.5 mol % of a polyfunctional acrylate having a urethane bond or an ester bond, in the presence of from 0.001 to 2 mol % of a radical polymerization initiator.

In the present invention, thanks to the configuration where the fumaric acid diester residue unit is a diisopropyl fumarate residue unit and the residue unit of a polyfunctional monomer having two or more radical polymerizable functional groups is a residue unit of a polyfunctional acrylate having a urethane bond or an ester bond, the fumaric acid diester-cinnamic acid ester-based copolymer can have excellent solubility in a solvent and be formed into a film by a solution casting method or other methods and the film becomes excellent in the film strength, toughness, transparency, etc.

EXAMPLES

The present invention is described below by referring to Examples, but the present invention is not limited to these Examples.

Incidentally, various physical properties indicated in Examples were measured by the following methods.

<Composition of Fumaric Acid Diester-Cinnamic Acid Ester-Based Copolymer>

The composition was determined by a proton nuclear magnetic resonance spectroscopy ($^1$H-NMR) spectral analysis using a nuclear magnetic resonance analyzer (trade name: JNM-GX270, manufactured by JEOL Ltd.).

<Measurement of Number Average Molecular Weight>

The molecular weight was measured at 40° C. by using a gel permeation chromatograph (GPC) (trade name: C0-8011 (equipped with column $GMH_{HR}$-H), manufactured by Tosoh Corp.) and using tetrahydrofuran as a solvent and determined as a value in terms of standard polystyrene.

Example 1

(Production of Diisopropyl Fumarate-Ethyl Cinnamate-Based Copolymer)

A glass ampule having a volume of 75 mL was charged with 50 g (0.25 mol (95.02 mol %)) of diisopropyl fumarate, 2.3 g (0.013 mol (4.94 mol %)) of ethyl cinnamate, 0.014 g ($1.1 \times 10^{-4}$ mol (0.04 mol %)) of divinylbenzene as a radical polymerizable polyfunctional monomer and 0.29 g (0.0016 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 28.8 g of a diisopropyl fumarate-ethyl cinnamate-based copolymer was obtained (yield: 55%).

The number average molecular weight of the obtained diisopropyl fumarate-ethyl cinnamate-based copolymer was 109,000.

In addition, the copolymer composition was confirmed by $^1$H-NMR measurement to be diisopropyl fumarate residue unit/ethyl cinnamate residue unit/divinylbenzene residue unit=94.97/4.99/0.04 (mol %).

Example 2

(Production of Diisopropyl Fumarate-Ethyl Cinnamate-Based Copolymer)

A glass ampule having a volume of 75 mL was charged with 50 g (0.25 mol (85.24 mol %)) of diisopropyl fumarate, 7.6 g (0.043 mol (14.66 mol %)) of ethyl cinnamate, 0.038 g ($2.9 \times 10^{-4}$ mol (0.10 mol %)) of divinylbenzene as a radical polymerizable polyfunctional monomer and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 32.3 g of a diisopropyl fumarate-ethyl cinnamate-based copolymer was obtained (yield: 57%).

The number average molecular weight of the obtained diisopropyl fumarate-ethyl cinnamate-based copolymer was 110,000.

In addition, the copolymer composition was confirmed by $^1$H-NMR measurement to be diisopropyl fumarate residue unit/ethyl cinnamate residue unit/divinylbenzene residue unit=82.95/16.95/0.1 (mol %).

Example 3

(Production of Diisopropyl Fumarate-Ethyl Cinnamate-Based Copolymer)

A glass ampule having a volume of 75 mL was charged with 50 g (0.25 mol (69.99 mol %)) of diisopropyl fumarate, 18.9 g (0.107 mol (29.96 mol %)) of ethyl cinnamate, 0.064 g ($1.8 \times 10^4$ mol (0.05 mol %)) of 1,1'-(methylenedi-4,1-phenylene)bismaleimide as a radical polymerizable polyfunctional monomer and 0.39 g (0.0023 mol (0.64 mol %)) of tert-butylperoxy pivalate as a polymerization initiator and after repeating nitrogen purging and pressure relief, sealed by fusion in an evacuated state. The ampule was put in a constant-temperature bath at 50° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 35.2 g of a diisopropyl fumarate-ethyl cinnamate-based copolymer was obtained (yield: 51%).

The number average molecular weight of the obtained diisopropyl fumarate-ethyl cinnamate-based copolymer was 120,000.

In addition, the copolymer composition was confirmed by $^1$H-NMR measurement to be diisopropyl fumarate residue unit/ethyl cinnamate residue unit/1,1'-(methylene di-4,1-phenylene)bismaleimide residue unit=70.97/28.98/0.05 (mol %).

Example 4

(Production of Diisopropyl Fumarate-Methyl Cinnamate-Based Copolymer)

A glass ampule having a volume of 75 mL was charged with 50 g (0.25 mol (85.30 mol %)) of diisopropyl fumarate, 7.2 g (0.043 mol (14.67 mol %)) of methyl cinnamate, 0.02 g ($8.7 \times 10^{-5}$ mol (0.03 mol %)) of 1,4-butanediol dimethacrylate as a radical polymerizable polyfunctional monomer and 0.16 g (0.0009 mol (0.31 mol %)) of tert-butylperoxy pivalate as a polymerization initiator and after repeating nitrogen purging and pressure relief, sealed by fusion in an evacuated state. The ampule was put in a constant-temperature bath at 46° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 31.5 g of a diisopropyl fumarate-methyl cinnamate-based copolymer was obtained (yield: 55%).

The number average molecular weight of the obtained diisopropyl fumarate-methyl cinnamate-based copolymer was 112,000.

In addition, the copolymer composition was confirmed by $^1$H-NMR measurement to be diisopropyl fumarate residue unit/methyl cinnamate residue unit/1,4-butanediol dimethacrylate residue unit=85.98/13.99/0.03 (mol %).

Example 5

(Production of Diisopropyl Fumarate-Isopropyl Cinnamate-Based Copolymer)

A glass ampule having a volume of 75 mL was charged with 50 g (0.25 mol (85.30 mol %)) of diisopropyl fumarate, 8.4 g (0.043 mol (14.67 mol %)) of isopropyl cinnamate, 0.023 g ($1.8 \times 10$ mol (0.03 mol %)) of divinylbenzene as a radical polymerizable polyfunctional monomer and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 33.9 g of a diisopropyl fumarate-isopropyl cinnamate-based copolymer was obtained (yield: 58%).

The number average molecular weight of the obtained diisopropyl fumarate-isopropyl cinnamate-based copolymer was 102,000.

In addition, the copolymer composition was confirmed by 1H-NMR measurement to be diisopropyl fumarate residue unit/isopropyl cinnamate residue unit/divinylbenzene residue unit=84.96/14.98/0.06 (mol %).

Example 6

(Production of Diethyl Fumarate-Ethyl Cinnamate-Based Copolymer)

A glass ampule having a volume of 75 mL was charged with 50 g (0.29 mol (95.67 mol %)) of diethyl fumarate, 2.3 g (0.013 mol (4.29 mol %)) of ethyl cinnamate, 0.014 g ($1.1 \times 10^{-4}$ mol (0.036 mol %)) of divinylbenzene as a radical polymerizable polyfunctional monomer and 0.29 g (0.0016 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 27.7 g of a diethyl fumarate-ethyl cinnamate-based copolymer was obtained (yield: 53%).

The number average molecular weight of the obtained diethyl fumarate-ethyl cinnamate-based copolymer was 105,000.

In addition, the copolymer composition was confirmed by $^1$H-NMR measurement to be diethyl fumarate residue unit/ethyl cinnamate residue unit/divinylbenzene residue unit=95.66/4.29/0.05 (mol %).

Example 7

(Production of Diisopropyl Fumarate-Ethyl Cinnamate-Based Copolymer)

A glass ampule having a volume of 75 mL was charged with 50 g (0.25 mol (95.01 mol %)) of diisopropyl fumarate, 2.3 g (0.013 mol (4.94 mol %)) of ethyl cinnamate, 0.026 g (1.3×10$^{-4}$ mol (0.05 mol %)) of triethylene glycol divinyl ether and 0.29 g (0.0016 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 27.2 g of a diisopropyl fumarate-ethyl cinnamate-based copolymer was obtained (yield: 52%).

The number average molecular weight of the obtained diisopropyl fumarate-ethyl cinnamate-based copolymer was 108,000.

In addition, the copolymer composition was confirmed by $^1$-NMR measurement to be diisopropyl fumarate residue unit/ethyl cinnamate residue unit/vinyl ether residue unit=94.96/4.99/0.05 (mol %).

Example 8

(Production of Diisopropyl Fumarate-Ethyl Cinnamate-Based Copolymer)

A glass ampule having a volume of 75 mL was charged with 50 g (0.25 mol (85.05 mol %)) of diisopropyl fumarate, 7.6 g (0.043 mol (14.63 mol %)) of ethyl cinnamate, 0.19 g (9.4×10$^{-4}$ mol (0.32 mol %)) of triethylene glycol divinyl ether and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 32.3 g of a diisopropyl fumarate-ethyl cinnamate-based copolymer was obtained (yield: 56%).

The number average molecular weight of the obtained diisopropyl fumarate-ethyl cinnamate-based copolymer was 125,000.

In addition, the copolymer composition was confirmed by $^1$H-NMR measurement to be diisopropyl fumarate residue unit/ethyl cinnamate residue unit/vinyl ether residue unit=82.78/16.94/0.28 (mol %).

Example 9

(Production of Diisopropyl Fumarate-Ethyl Cinnamate-Based Copolymer)

A glass ampule having a volume of 75 mL was charged with 50 g (0.25 mol (70.00 mol %)) of diisopropyl fumarate, 18.9 g (0.107 mol (29.96 mol %)) of ethyl cinnamate, 0.025 g (1.5×10$^{-4}$ mol (0.04 mol %)) of diethylene glycol divinyl ether and 0.39 g (0.0023 mol (0.64 mol %)) of tert-butylperoxy pivalate as a polymerization initiator and after repeating nitrogen purging and pressure relief, sealed by fusion in an evacuated state. The ampule was put in a constant-temperature bath at 50° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 36.5 g of a diisopropyl fumarate-ethyl cinnamate-based copolymer was obtained (yield: 53%).

The number average molecular weight of the obtained diisopropyl fumarate-ethyl cinnamate-based copolymer was 101,000.

In addition, the copolymer composition was confirmed by $^1$H-NMR measurement to be diisopropyl fumarate residue unit/ethyl cinnamate residue unit/vinyl ether residue unit=70.98/28.98/0.04 (mol %).

Example 10

(Production of Diisopropyl Fumarate-Methyl Cinnamate-Based Copolymer)

A glass ampule having a volume of 75 mL was charged with 50 g (0.25 mol (85.31 mol %)) of diisopropyl fumarate, 7.2 g (0.043 mol (14.67 mol %)) of methyl cinnamate, 0.009 g (6.3×10$^{-5}$ mol (0.02 mol %)) of butanediol divinyl ether and 0.16 g (0.0009 mol (0.31 mol %)) of tert-butylperoxy pivalate as a polymerization initiator and after repeating nitrogen purging and pressure relief, sealed by fusion in an evacuated state. The ampule was put in a constant-temperature bath at 46° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 30.9 g of a diisopropyl fumarate-methyl cinnamate-based copolymer was obtained (yield: 54%).

The number average molecular weight of the obtained diisopropyl fumarate-methyl cinnamate-based copolymer was 98,000.

In addition, the copolymer composition was confirmed by $^1$H-NMR measurement to be diisopropyl fumarate residue unit/methyl cinnamate residue unit/vinyl ether residue unit=85.99/13.99/0.02 (mol %).

Example 11

(Production of Diisopropyl Fumarate-Isopropyl Cinnamate-Based Copolymer)

A glass ampule having a volume of 75 mL was charged with 50 g (0.25 mol (85.04 mol %)) of diisopropyl fumarate, 8.4 g (0.043 mol (14.63 mol %)) of isopropyl cinnamate, 0.19 g (9.7×10$^{-4}$ mol (0.33 mol %)) of 1,4-cyclohexanedimethanol divinyl ether and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 33.9 g of a diisopropyl fumarate-isopropyl cinnamate-based copolymer was obtained (yield: 58%).

The number average molecular weight of the obtained diisopropyl fumarate-isopropyl cinnamate-based copolymer was 143,000.

In addition, the copolymer composition was confirmed by 1H-NMR measurement to be diisopropyl fumarate residue unit/isopropyl cinnamate residue unit/vinyl ether residue unit=84.73/14.97/0.3 (mol %).

Example 12

(Production of Diisopropyl Fumarate-Ethyl Cinnamate-Based Copolymer)

A glass ampule having a volume of 75 mL was charged with 50 g (0.25 mol (94.83 mol %)) of diisopropyl fumarate, 2.3 g (0.013 mol (4.93 mol %)) of ethyl cinnamate, 0.12 g (6.4×10$^{-4}$ mol (0.24 mol %)) of 2-(vinyloxyethoxy)ethyl acrylate and 0.29 g (0.0016 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 29.3 g of a diisopropyl fumarate-ethyl cinnamate-based copolymer was obtained (yield: 56%).

The number average molecular weight of the obtained diisopropyl fumarate-ethyl cinnamate-based copolymer was 129,000.

In addition, the copolymer composition was confirmed by $^1$H-NMR measurement to be diisopropyl fumarate residue unit/ethyl cinnamate residue unit/vinyl ether residue unit=94.77/4.99/0.24 (mol %).

Example 13

(Production of Diisopropyl Fumarate-Ethyl Cinnamate-Acrylate-Based Copolymer)

A glass ampule having a volume of 75 mL was charged with 50 g (0.25 mol (95.01 mol %)) of diisopropyl fumarate, 2.3 g (0.013 mol (4.94 mol %)) of ethyl cinnamate, 0.156 g (1.2×10$^{-4}$ mol (0.045 mol %)) of urethane acrylate compound (trade name) UA-4200 (produced by Shin-Nakamura Chemical Co., Ltd.) as a polyfunctional acrylate having a urethane bond and 0.29 g (0.0016 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 30.4 g of a diisopropyl fumarate-ethyl cinnamate-acrylate-based copolymer was obtained (yield: 58%).

The number average molecular weight of the obtained diisopropyl fumarate-ethyl cinnamate-acrylate-based copolymer was 121,000.

In addition, the copolymer composition was confirmed by $^1$H-NMR measurement to be diisopropyl fumarate residue unit/ethyl cinnamate residue unit/acrylate residue unit=94.96/4.99/0.05 (mol %).

The diisopropyl fumarate-ethyl cinnamate-acrylate-based copolymer was dissolved in methyl isobutyl ketone to form a 15 wt % resin solution, and the resin solution was cast on a polyethylene terephthalate film of 10 cm×10 cm by a coater and dried at 130° C. for 10 minutes to obtain a 30 µm-thick transparent film using a diisopropyl fumarate-ethyl cinnamate-acrylate-based copolymer. A flexing test of bending the obtained film to bring the end parts into contact with each other was carried out, as a result, cracking, etc. were not observed in the diisopropyl fumarate-ethyl cinnamate-acrylate-based copolymer layer, revealing excellent toughness.

Example 14

(Production of Diisopropyl Fumarate-Ethyl Cinnamate-Acrylate-Based Copolymer)

A glass ampule having a volume of 75 mL was charged with 50 g (0.25 mol (85.23 mol %)) of diisopropyl fumarate, 7.6 g (0.043 mol (14.66 mol %)) of ethyl cinnamate, 0.4 g (3.1×10$^{-4}$ mol (0.11 mol %)) of urethane acrylate compound (trade name) UA-4200 (produced by Shin-Nakamura Chemical Co., Ltd.) as a polyfunctional acrylate having a urethane bond and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 35.4 g of a diisopropyl fumarate-ethyl cinnamate-acrylate-based copolymer was obtained (yield: 61%).

The number average molecular weight of the obtained diisopropyl fumarate-ethyl cinnamate-acrylate-based copolymer was 127,000.

In addition, the copolymer composition was confirmed by $^1$H-NMR measurement to be diisopropyl fumarate residue unit/ethyl cinnamate residue unit/acrylate residue unit=82.94/16.94/0.12 (mol %).

The obtained diisopropyl fumarate-ethyl cinnamate-acrylate-based copolymer was formed into a film by the same method as in Example 13, and a flexing test was carried out, as a result, cracking, etc. were not observed in the obtained transparent film, revealing excellent toughness.

Example 15

(Production of Diisopropyl Fumarate-Ethyl Cinnamate-Acrylate-Based Copolymer)

A glass ampule having a volume of 75 mL was charged with 50 g (0.25 mol (69.99 mol %)) of diisopropyl fumarate, 18.9 g (0.107 mol (29.96 mol %)) of ethyl cinnamate, 0.2 g (1.7×10 mol (0.05 mol %)) of urethane acrylate compound (trade name) UA-6HA (produced by Shin-Nakamura Chemical Co., Ltd.) as a polyfunctional acrylate having a urethane bond and 0.39 g (0.0023 mol (0.64 mol %)) of tert-butylperoxy pivalate as a polymerization initiator and after repeating nitrogen purging and pressure relief, sealed by fusion in an evacuated state. The ampule was put in a constant-temperature bath at 50° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 37.3 g of a diisopropyl fumarate-ethyl cinnamate-acrylate-based copolymer was obtained (yield: 54%).

The number average molecular weight of the obtained diisopropyl fumarate-ethyl cinnamate-acrylate-based copolymer was 129,000.

In addition, the copolymer composition was confirmed by $^1$H-NMR measurement to be diisopropyl fumarate residue unit/ethyl cinnamate residue unit/acrylate residue unit=70.98/28.98/0.04 (mol %).

The obtained diisopropyl fumarate-ethyl cinnamate-acrylate-based copolymer was formed into a film by the same method as in Example 13, and a flexing test was carried out, as a result, cracking, etc. were not observed in the obtained transparent film, revealing excellent toughness.

Example 16

(Production of Diisopropyl Fumarate-Methyl Cinnamate-Acrylate-Based Copolymer)

A glass ampule having a volume of 75 mL was charged with 50 g (0.25 mol (85.30 mol %)) of diisopropyl fumarate, 7.2 g (0.043 mol (14.67 mol %)) of methyl cinnamate, 0.12 g (8.9×10$^{-5}$ mol (0.03 mol %)) of urethane acrylate compound (trade name) UA-7200 (produced by Shin-Nakamura Chemical Co., Ltd.) as a polyfunctional acrylate having a urethane bond and 0.16 g (0.0009 mol (0.31 mol %)) of tert-butylperoxy pivalate as a polymerization initiator and after repeating nitrogen purging and pressure relief, sealed by fusion in an evacuated state.

The ampule was put in a constant-temperature bath at 46° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 33.2 g of a diisopropyl fumarate-methyl cinnamate-acrylate-based copolymer was obtained (yield: 58%).

The number average molecular weight of the obtained diisopropyl fumarate-methyl cinnamate-acrylate-based copolymer was 122,000.

In addition, the copolymer composition was confirmed by $^1$H-NMR measurement to be diisopropyl fumarate residue unit/methyl cinnamate residue unit/acrylate residue unit=85.98/13.99/0.03 (mol %).

The obtained diisopropyl fumarate-methyl cinnamate-acrylate-based copolymer was formed into a film by the same method as in Example 13, and a flexing test was carried out, as a result, cracking, etc. were not observed in the obtained transparent film, revealing excellent toughness.

Example 17

(Production of Diisopropyl Fumarate-Isopropyl Cinnamate-Acrylate-Based Copolymer)

A glass ampule having a volume of 75 mL was charged with 50 g (0.25 mol (85.26 mol %)) of diisopropyl fumarate, 8.4 g (0.043 mol (14.67 mol %)) of isopropyl cinnamate, 0.27 g (2.1×10$^{-4}$ mol (0.07 mol %)) of urethane acrylate compound (trade name) UA-4200 (produced by Shin-Nakamura Chemical Co., Ltd.) as a polyfunctional acrylate having a urethane bond and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 35.5 g of a diisopropyl fumarate-isopropyl cinnamate-acrylate-based copolymer was obtained (yield: 60%).

The number average molecular weight of the obtained diisopropyl fumarate-isopropyl cinnamate-acrylate-based copolymer was 120,000.

In addition, the copolymer composition was confirmed by $^1$H-NMR measurement to be diisopropyl fumarate residue unit/isopropyl cinnamate residue unit/acrylate residue unit=84.95/14.97/0.08 (mol %).

The obtained diisopropyl fumarate-isopropyl cinnamate-acrylate-based copolymer was formed into a film by the same method as in Example 13, and a flexing test was carried out, as a result, cracking, etc. were not observed in the obtained transparent film, revealing excellent toughness.

Example 18

(Production of Diisopropyl Fumarate-Ethyl Cinnamate-Acrylate-Based Copolymer)

A glass ampule having a volume of 75 mL was charged with 50 g (0.25 mol (95.01 mol %)) of diisopropyl fumarate, 2.3 g (0.013 mol (4.94 mol %)) of ethyl cinnamate, 0.027 g (1.2×10$^{-4}$ mol (0.045 mol %)) of 1,6-hexanediol diacrylate and 0.29 g (0.0016 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 29.3 g of a diisopropyl fumarate-ethyl cinnamate-acrylate-based copolymer was obtained (yield: 56%).

The number average molecular weight of the obtained diisopropyl fumarate-ethyl cinnamate-acrylate-based copolymer was 119,000.

In addition, the copolymer composition was confirmed by $^1$H-NMR measurement to be diisopropyl fumarate residue unit/ethyl cinnamate residue unit/acrylate residue unit=94.96/4.99/0.05 (mol %).

The obtained diisopropyl fumarate-ethyl cinnamate-acrylate-based copolymer was formed into a film by the same method as in Example 13, and a flexing test was carried out, as a result, cracking, etc. were not observed in the obtained transparent film, revealing excellent toughness.

Example 19

(Production of Diisopropyl Fumarate-Ethyl Cinnamate-Acrylate-Based Copolymer)

A glass ampule having a volume of 75 mL was charged with 50 g (0.25 mol (85.23 mol %)) of diisopropyl fumarate, 7.6 g (0.043 mol (14.66 mol %)) of ethyl cinnamate, 0.07 g ($3.1 \times 10^{-4}$ mol (0.11 mol %)) of 1,6-hexanediol diacrylate and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 32.9 g of a diisopropyl fumarate-ethyl cinnamate-acrylate-based copolymer was obtained (yield: 57%).

The number average molecular weight of the obtained diisopropyl fumarate-ethyl cinnamate-acrylate-based copolymer was 123,000.

In addition, the copolymer composition was confirmed by $^1$H-NMR measurement to be diisopropyl fumarate residue unit/ethyl cinnamate residue unit/acrylate residue unit=82.94/16.94/0.12 (mol %).

The obtained diisopropyl fumarate-ethyl cinnamate-acrylate-based copolymer was formed into a film by the same method as in Example 13, and a flexing test was carried out, as a result, cracking, etc. were not observed in the obtained transparent film, revealing excellent toughness.

Example 20

(Production of Diisopropyl Fumarate-Ethyl Cinnamate-Acrylate-Based Copolymer)

A glass ampule having a volume of 75 mL was charged with 50 g (0.25 mol (69.99 mol %)) of diisopropyl fumarate, 18.9 g (0.107 mol (29.96 mol %)) of ethyl cinnamate, 0.029 g ($1.7 \times 10^{-4}$ mol (0.05 mol %)) of ethylene glycol diacrylate and 0.39 g (0.0023 mol (0.64 mol %)) of tert-butylperoxy pivalate as a polymerization initiator and after repeating nitrogen purging and pressure relief, sealed by fusion in an evacuated state. The ampule was put in a constant-temperature bath at 50° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 35.1 g of a diisopropyl fumarate-ethyl cinnamate-acrylate-based copolymer was obtained (yield: 51%).

The number average molecular weight of the obtained diisopropyl fumarate-ethyl cinnamate-acrylate-based copolymer was 121,000.

In addition, the copolymer composition was confirmed by $^1$H-NMR measurement to be diisopropyl fumarate residue unit/ethyl cinnamate residue unit/acrylate residue unit=70.98/28.98/0.04 (mol %).

The obtained diisopropyl fumarate-ethyl cinnamate-acrylate-based copolymer was formed into a film by the same method as in Example 13, and a flexing test was carried out, as a result, cracking, etc. were not observed in the obtained transparent film, revealing excellent toughness.

Example 21

(Production of Diisopropyl Fumarate-Methyl Cinnamate-Acrylate-Based Copolymer)

A glass ampule having a volume of 75 mL was charged with 50 g (0.25 mol (85.30 mol %)) of diisopropyl fumarate, 7.2 g (0.043 mol (14.67 mol %)) of methyl cinnamate, 0.018 g ($8.9 \times 10^{-5}$ mol (0.03 mol %)) of 1,4-butanediol diacrylate and 0.16 g (0.0009 mol (0.31 mol %)) of tert-butylperoxy pivalate as a polymerization initiator and after repeating nitrogen purging and pressure relief, sealed by fusion in an evacuated state. The ampule was put in a constant-temperature bath at 46° C. and held for 168 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 31.5 g of a diisopropyl fumarate-methyl cinnamate-acrylate-based copolymer was obtained (yield: 55%).

The number average molecular weight of the obtained diisopropyl fumarate-methyl cinnamate-acrylate-based copolymer was 118,000.

In addition, the copolymer resin composition was confirmed by $^1$H-NMR measurement to be diisopropyl fumarate residue unit/methyl cinnamate residue unit/acrylate residue unit=85.98/13.99/0.03 (mol %).

The obtained diisopropyl fumarate-methyl cinnamate-acrylate-based copolymer was formed into a film by the same method as in Example 13, and a flexing test was carried out, as a result, cracking, etc. were not observed in the obtained transparent film, revealing excellent toughness.

Example 22

(Production of Diisopropyl Fumarate-Isopropyl Cinnamate-Acrylate-Based Copolymer)

A glass ampule having a volume of 75 mL was charged with 50 g (0.25 mol (85.26 mol %)) of diisopropyl fumarate, 8.4 g (0.043 mol (14.67 mol %)) of isopropyl cinnamate, 0.063 g ($2.1 \times 10^{-4}$ mol (0.07 mol %)) of pentaerythritol triacrylate and 0.32 g (0.0018 mol (0.61 mol %)) of tert-butylperoxy pivalate as a polymerization initiator and after repeating nitrogen purging and pressure relief, sealed by fusion in an evacuated state. The ampule was put in a constant-temperature bath at 50° C. and held for 144 hours, thereby performing radical polymerization. After the completion of polymerization reaction, the polymerization product was taken out from the ampule and dissolved in 400 g of tetrahydrofuran. The resulting polymer solution was added dropwise to 3 L of methanol to precipitate a polymer, and the precipitate was then vacuum-dried at 80° C. for 10 hours, whereby 34.5 g of a diisopropyl fumarate-isopropyl cinnamate-acrylate-based copolymer was obtained (yield: 59%).

The number average molecular weight of the obtained diisopropyl fumarate-isopropyl cinnamate-acrylate-based copolymer was 122,000.

In addition, the copolymer composition was confirmed by $^1$H-NMR measurement to be diisopropyl fumarate residue unit/isopropyl cinnamate residue unit/acrylate residue unit=84.95/14.97/0.08 (mol %).

The obtained diisopropyl fumarate-isopropyl cinnamate-acrylate-based copolymer was formed into a film by the same method as in Example 13, and a flexing test was carried out, as a result, cracking, etc. were not observed in the obtained transparent film, revealing excellent toughness.

Comparative Example 1

17 g of a diisopropyl fumarate-ethyl cinnamate copolymer was obtained (yield: 33%) by the same method as in Example 1 except that divinylbenzene as a radical polymerizable polyfunctional monomer was not used.

The number average molecular weight of the obtained diisopropyl fumarate-ethyl cinnamate copolymer was as low as 72,000, and the yield was also very low and 33%. The copolymer composition obtained by $^1$H-NMR measurement was diisopropyl fumarate residue unit/ethyl cinnamate residue unit=95/5 (mol %).

The obtained diisopropyl fumarate-ethyl cinnamate copolymer was formed into a film by the same method as in Example 13, and a flexing test was carried out, as a result, a crack was generated in the diisopropyl fumarate-ethyl cinnamate copolymer layer soon after application of a bending stress.

Comparative Example 2

8 g of a diisopropyl fumarate-ethyl cinnamate copolymer was obtained (yield: 15%) by the same method as in Example 2 except that divinylbenzene as a radical polymerizable polyfunctional monomer was not used.

The number average molecular weight of the obtained diisopropyl fumarate-ethyl cinnamate copolymer was as low as 54,000, and the yield was also very low and 15%. The copolymer composition obtained by $^1$H-NMR measurement was diisopropyl fumarate residue unit/ethyl cinnamate residue unit=83/17 (mol %).

The obtained diisopropyl fumarate-ethyl cinnamate copolymer was formed into a film by the same method as in Example 13, and a flexing test was carried out, as a result, a crack was generated in the diisopropyl fumarate-ethyl cinnamate copolymer layer soon after application of a bending stress.

Comparative Example 3

13 g of a diisopropyl fumarate-ethyl cinnamate copolymer was obtained (yield: 19%) by the same method as in Example 3 except that 1,1'-(methylenedi-4,1-phenylene)bis-maleimide as a radical polymerizable polyfunctional monomer was not used.

The number average molecular weight of the obtained diisopropyl fumarate-ethyl cinnamate copolymer was as low as 61,000, and the yield was also very low and 19%. The copolymer composition obtained by $^1$H-NMR measurement was diisopropyl fumarate residue unit/ethyl cinnamate residue unit=71/29 (mol %).

The obtained diisopropyl fumarate-ethyl cinnamate copolymer was formed into a film by the same method as in Example 13, and a flexing test was carried out, as a result, a crack was generated in the diisopropyl fumarate-ethyl cinnamate copolymer layer soon after application of a bending stress.

Comparative Example 4

5 g of a diisopropyl fumarate-methyl cinnamate copolymer was obtained (yield: 8%) by the same method as in Example 4 except that 1,4-butanediol dimethacrylate as a radical polymerizable polyfunctional monomer was not used.

The number average molecular weight of the obtained diisopropyl fumarate-methyl cinnamate copolymer was as low as 78,000, and the yield was also very low and 8%. The copolymer composition obtained by 1H-NMR measurement was diisopropyl fumarate residue unit/methyl cinnamate residue unit=86/14 (mol %).

The obtained diisopropyl fumarate-methyl cinnamate copolymer was formed into a film by the same method as in Example 13, and a flexing test was carried out, as a result, a crack was generated in the diisopropyl fumarate-methyl cinnamate copolymer layer soon after application of a bending stress.

Comparative Example 5

11 g of a diisopropyl fumarate-isopropyl cinnamate copolymer was obtained (yield: 18%) by the same method as in Example 5 except that divinylbenzene as a radical polymerizable polyfunctional monomer was not used.

The number average molecular weight of the obtained diisopropyl fumarate-isopropyl cinnamate copolymer was as low as 49,000, and the yield was also very low and 18%. The copolymer composition obtained by $^1$H-NMR measurement was diisopropyl fumarate residue unit/isopropyl cinnamate residue unit=85/15 (mol %).

The obtained diisopropyl fumarate-isopropyl cinnamate copolymer was formed into a film by the same method as in Example 13, and a flexing test was carried out, as a result, a crack was generated in the diisopropyl fumarate-isopropyl cinnamate copolymer layer soon after application of a bending stress.

Comparative Example 6

11 g of a diethyl fumarate-ethyl cinnamate copolymer was obtained (yield: 21%) by the same method as in Example 6 except that divinylbenzene as a radical polymerizable polyfunctional monomer was not used.

The number average molecular weight of the obtained diethyl fumarate-ethyl cinnamate copolymer was as low as 54,000, and the yield was also very low and 21%. The copolymer composition obtained by $^1$H-NMR measurement was diethyl fumarate residue unit/ethyl cinnamate residue unit=96/4 (mol %).

While the invention has been described in detail and with reference to specific embodiments thereof, it will be apparent to one skilled in the art that various changes and modifications can be made therein without departing from the spirit and scope of the invention.

This application is based on two Japanese Patent Applications (Patent Application Nos. 2012-259771 and 2012-259772) filed on Nov. 28, 2012, Japanese Patent Application (Patent Application No. 2012-273982) filed on Dec. 14, 2012, and Japanese Patent Application (Patent Application No. 2013-085661) filed on Apr. 16, 2013, the entirety of which is incorporated herein by way of reference. All references cited herein are incorporated in their entirety.

INDUSTRIAL APPLICABILITY

The present invention provides a novel fumaric acid diester-cinnamic acid ester-based copolymer having a high molecular weight and a method for efficiently producing the fumaric acid diester-cinnamic acid ester-based copolymer, and the fumaric acid diester-cinnamic acid ester-based copolymer is expected to be utilized as a film, etc.

The invention claimed is:

1. A fumaric acid diester-cinnamic acid ester-based copolymer, comprising:
    a fumaric acid diester residue unit;
    a cinnamic acid ester residue unit having an alkyl group with a carbon number of 1 to 6; and
    a residue unit of a polyfunctional monomer having two or more radical polymerizable functional groups.

2. The fumaric acid diester-cinnamic acid ester-based copolymer according to claim 1, wherein the fumaric acid diester residue unit is a diethyl fumarate residue unit or a diisopropyl fumarate residue unit.

3. The fiimaric acid diester-cinnamic acid ester-based copolymer according to claim 1, comprising:
    from 50 to 98 mol % of the fumaric acid diester residue unit;
    from 1 to 49 mol % of the cinnamic acid ester residue unit having an alkyl group with a carbon number of 1 to 6; and
    from 0.01 to 1 mol % of the residue unit of the polyfunctional monomer having two or more radical polymerizable functional groups.

4. The fumaric acid diester-cinnamic acid ester-based copolymer according to claim 1, comprising:
    from 50 to 98.5 mol % of the diisopropyl fumarate residue unit;
    from 1 to 49.5 mol % of the cinnamic acid ester residue unit having an alkyl group with a carbon number of 1 to 6; and
    from 0.01 to 0.5 mol % of the residue unit of the polyfunctional monomer having two or more radical polymerizable functional groups.

5. The fumaric acid diester-cinnamic acid ester-based copolymer according to claim 1, wherein the cinnamic acid ester residue unit is selected from the group consisting of a methyl cinnamate residue unit, an ethyl cinnamate residue unit and an isopropyl cinnamate residue unit.

6. The fumaric acid diester-cinnamic acid ester-based copolymer according to claim 1, wherein the residue unit of the polyfunctional monomer having two or more radical polymerizable functional groups is an aromatic polyvinyl compound or a polyfunctional vinyl ether having two or more radical polymerizable functional groups.

7. The fumaric acid diester-cinnamic acid ester-based copolymer according to claim 1,
    wherein
    the fumaric acid diester residue unit is a diisopropyl fumarate residue unit, and
    the residue unit of the polyfunctional monomer having two or more radical polymerizable functional groups is a residue unit of a polyfunctional acrylate having a urethane bond.

8. The fumaric acid diester-cinnamic acid ester-based copolymer according to claim 1,
    wherein
    the fumaric acid diester residue unit is a diisopropyl fumarate residue unit, and
    the residue unit of the polyfunctional monomer having two or more radical polymerizable functional groups is a residue unit of a polyfunctional acrylate having an ester bond.

9. The fumaric acid diester-cinnamic acid ester-based copolymer according to claim 6, wherein a number average molecular weight in terms of standard polystyrene is from 70,000 to 500,000.

10. The fumaric acid diester-cinnamic acid ester-based copolymer according to claim 8, wherein a number average molecular weight in terms of standard polystyrene is from 60,000 to 500,000.

11. A method for producing a fumaric acid diester-cinnamic acid ester-based copolymer, comprising:
    performing a radical polymerization reaction with a total of 100 mol % of monomers comprising from 50 to 98 mol % of a fumaric acid diester, from 1 to 49 mol % of a cinnamic acid ester having an alkyl group with a carbon number of 1 to 6, and from 0.01 to 1 mol % of a polyfunctional monomer having two or more radical polymerizable functional groups, in the presence of from 0.001 to 2 mol % of a radical polymerization initiator.

12. A method for producing a fumaric acid diester-cinnamic acid ester-based copolymer, comprising:
    performing a radical polymerization reaction with a total of 100 mol % of monomers comprising from 50 to 98.5 mol % of diisopropyl fumarate, from 1 to 49.5 mol % of a cinnamic acid ester having an alkyl group with a carbon number of 1 to 6, and from 0.01 to 0.5 mol % of a polyfunctional acrylate having at least either one of a urethane bond and an ester bond, in the presence of from 0.001 to 2 mol % of a radical polymerization initiator.

13. A film, comprising the fumaric acid diester-cinnamic acid ester-based copolymer according to claim 6.

* * * * *